S. M. DICK.
TRANSMISSION MECHANISM.
APPLICATION FILED JAN. 22, 1914.

1,232,243.

Patented July 3, 1917.
2 SHEETS—SHEET 1.

WITNESSES

INVENTOR
SAMUEL M. DICK
BY
ATTORNEYS

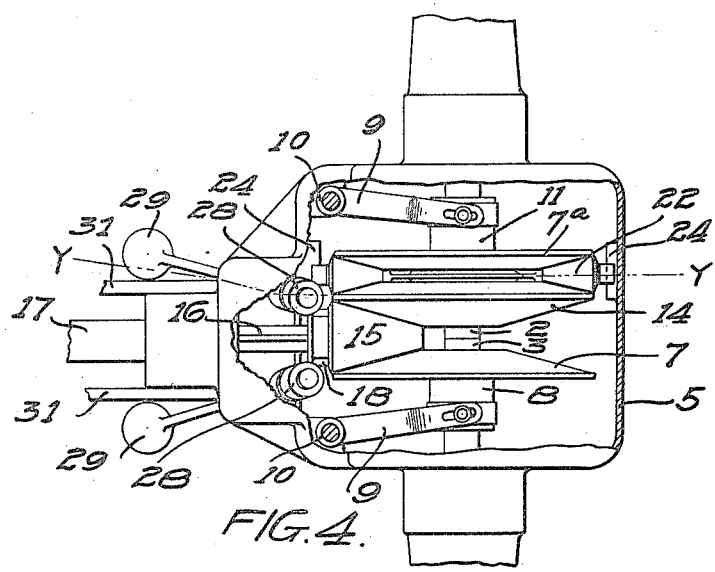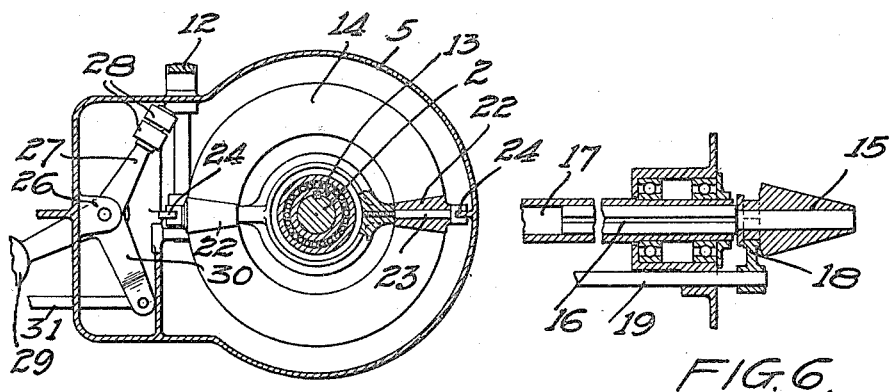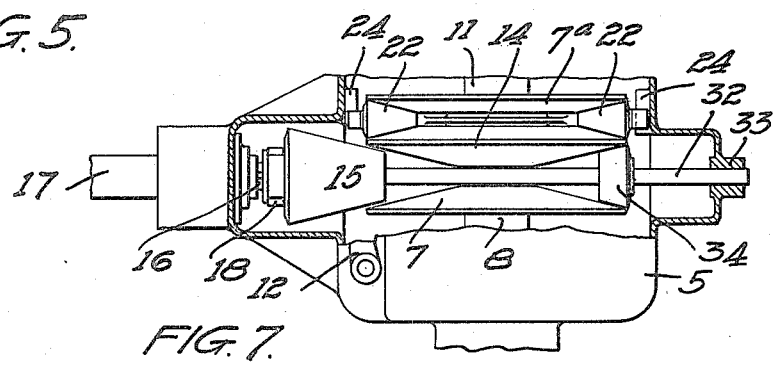

UNITED STATES PATENT OFFICE.

SAMUEL M. DICK, OF MINNEAPOLIS, MINNESOTA, ASSIGNOR OF ONE-HALF TO ANDREW H. MAAS, OF MINNEAPOLIS, MINNESOTA.

TRANSMISSION MECHANISM.

1,232,243. Specification of Letters Patent. Patented July 3, 1917.

Application filed January 22, 1914. Serial No. 813,674.

*To all whom it may concern:*

Be it known that I, SAMUEL M. DICK, citizen of the United States, resident of Minneapolis, county of Hennepin, State of Minnesota, have invented certain new and useful Improvements in Transmission Mechanisms, of which the following is a specification.

The object of my invention is to provide a mechanism by means of which the power of a self-propelled vehicle can be applied directly to the axle without the use of a chain or gear driving mechanism, the mechanism possessing such a degree of flexibility that the operator or driver of the vehicle, such as an automobile, can run the car at any speed from one or two miles per hour to forty or fifty miles.

A further object is to provide a transmission mechanism of simple, but strong and durable construction, and one which can not be easily broken or deranged.

A further object is to provide a simple and convenient reversing means by which a change in direction of movement can be easily and quickly effected.

The invention consists generally in various constructions and combinations, all as hereinafter described and particularly pointed out in the claims.

In the accompanying drawings forming part of this specification,

Fig. 4 is a detail sectional view, showing the reversing mechanism in its raised or inoperative position.

Fig. 5 is a sectional view on the line $y$—$y$ of Fig. 4,

Fig. 6 is a detail sectional view of the driving cone and the bearing therefor,

Fig. 7 is a view, partially in section, illustrating a modified construction, showing another form or type of reversing means.

Figure 1:
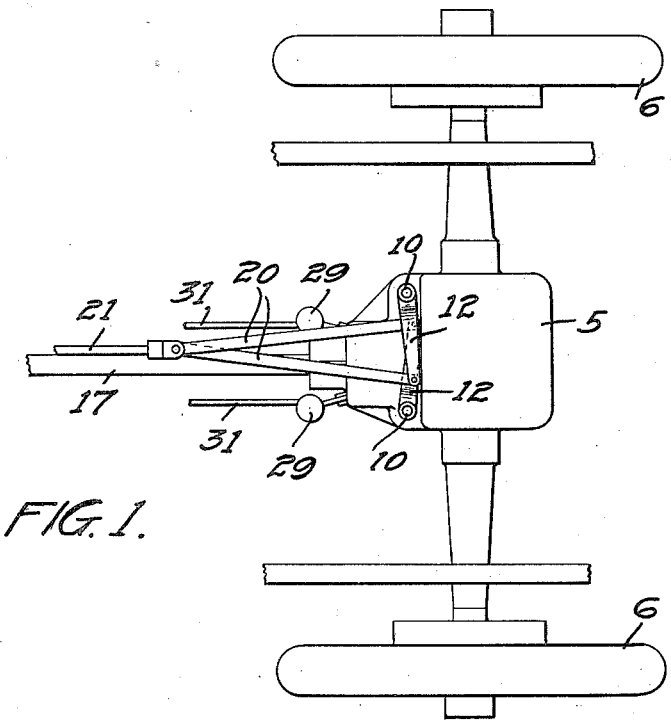
Figure 1 is a plan view of the rear portion of an automobile chassis with my invention applied thereto.
Figure 3:
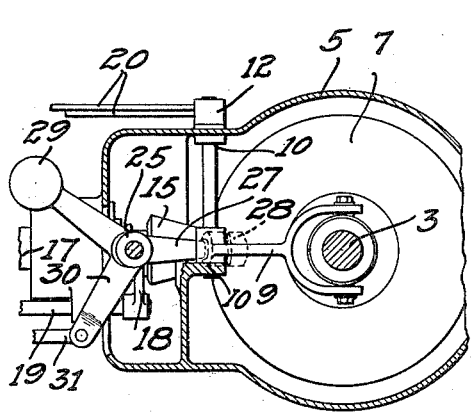
Fig. 3 is a sectional view on the line $x$—$x$ of Fig. 2.
Figure 2:
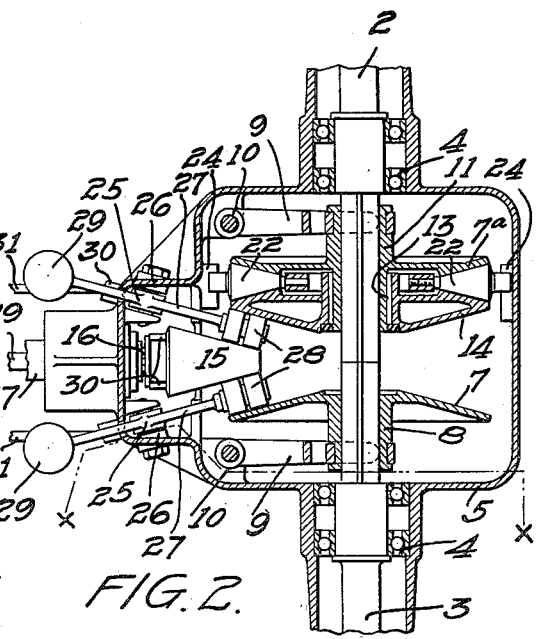
Fig. 2 is a horizontal sectional view, illustrating the mechanism on the axle of the car.

In the drawing, 2 and 3 represent the sections of an axle, placed end to end and provided with suitable bearings 4 in a housing 5. Carrying wheels 6 are mounted on these axle sections in any suitable way. 7 represents a cone-faced disk having a hub 8 that is splined on the axle section 3, and provided with the usual shifter lever 9 pivoted at 10 in the housing 5. A similar cone $7^a$ has a hub 11 splined on the axle section 2 and moved back and forth thereon by means of a shifter lever of substantially the same construction as described and which I will indicate by the same reference numeral. These shifter levers are provided with arms 12 mounted to lap by one another, as indicated in Fig. 1, and forming cranks by means of which the said levers can be rocked to move the cone-faced disks back and forth on the axle sections. The hub 11 has a bearing 13 thereon for the disk 14 which is provided with a double cone face and is idle or free to revolve on the hub 11, independently of the cone disk $7^a$. The function of this double faced disk will hereinafter appear.

15 is a driving cone having a stem 16 that is splined within a hollow drive shaft 17 extending to a suitable source of power, not shown. A shifter arm 18 has a forked end to receive the cone 15 and is connected to an operating rod 19 that is controlled from the driver's seat by means of a suitable lever or pedal, not shown. The movement of this rod 19 in one direction will force the drive cone toward the axle sections and between the disks 7 and 14, where the drive cone will be locked until such time as it is desired to reverse the direction of movement. The arms 12 are connected by links 20 with an operating rod 21 which extends to a point convenient to the driver's seat so that when the driving cone has been adjusted to the desired position for operating the machine, the shifter levers 9 may be oscillated to move the cones 7 and $7^a$ toward one another until the faces of the disks 7 and 14 are in frictional engagement with the driving cone.

Between the disks $7^a$ and 14 are two idle cones 22, carried by spindles 23, which at their inner ends straddle the hub 8 and are arranged to slide at their outer ends upon webs 24 which project inwardly from the housing 5. The function of these idle cones is to reverse the direction of movement of the disk $7^a$ with respect to the disk 14 and thereby cause the disks 7 and $7^a$ to travel in the same direction. These idle cones, being carried by the housing, will always be in frictional engagement with the surfaces of the disks 7ᵃ and 14, moving back and forth on the axle section with these disks when the shifter levers are operated. Obviously, the speed of the vehicle can be varied by changing the position of the cone 15 with respect to the frictional surfaces of the disks 7 and 14. The driver will first decide the speed desired and set the driving cone 15 accordingly and lock the cone in that position where it will revolve continuously. The disks 7 and 14 will then be moved into frictional engagement with this cone and the power will be transmitted therefrom to the auxiliary sections without the use of any gears or belts. This driving cone and the surfaces of the disks will be of sufficient area and the degree of lateral pressure will be sufficient to hold the friction surfaces together without slipping, thereby permitting the use of a cone with a comparatively soft surface, such as leather, rawhide, fiber, or other suitable material which will maintain its shape and allow the mechanism to be driven at a high speed and without the noise usually incident to the operation of a transmission mechanism.

To reverse the direction of movement of the mechanism, I prefer to provide hubs 25 mounted on bearings 26 in the housing 5 upon opposite sides of the driving cone 15. Arms 27 project inwardly from these hubs in planes parallel, substantially, with the surfaces of the cone 15 and carrying anti-friction rolls 28 which form driving connections between the disks 7 and 14 and the driving cone and cause the direction of movement of these disks and the axle sections on which they are mounted to be reversed. The hubs 25 are preferably provided with weights 29 which normally hold the arms 27 in a raised, inoperative position, as indicated in Fig. 5, where the rolls 28 will be out of contact with the friction disks. Arms 30 depend from said hubs and operating rods 31 extend from said arms to the forward portion of the machine, where they can be conveniently operated to tilt the arms 27 to an operative position whenever it is desired to reverse the transmission mechanism.

In the operation of this transmission mechanism, the driving cone 15 is moved to a point between the friction disks, the degree of movement depending upon the speed desired. The friction disks are then moved into contact with the cone for the forward drive of the machine. If a change of speed is desired, the friction disks are separated, the position of the cone changed, and the disks again moved into engagement with it. The power will be applied uniformly to both axle sections and the operation of the transmission mechanism will be smooth and practically noiseless. Whenever desired, the friction disks may be moved apart and the reversing rolls dropped down between them and the driving cone, and when these rolls are clamped against the driving cone the direction of movement of the axles will be reversed.

In some instances I may prefer to dispense with the oscillating reversing rolls 28 and provide an extension 32 of the driving cone spindle mounted to slide in a bearing 33 on the housing upon the opposite side of the cut or independent axle sections from the driving cone 15. Upon this extension 32 I mount a cone 34 that is also on the opposite side of the axle sections from the driving cone and arranged to contact with the surfaces of the friction disks 7 and 14 when the driving cone is out of contact with these surfaces, as indicated in Fig. 7. This construction will obviously result in the reversal of the direction of movement of the disks 7 and 14 and drive the machine backward.

In various ways the details of construction herein shown and described may be modified and still be within the scope of my invention.

I claim as my invention:

1. A power transmission mechanism comprising axle sections, friction disks splined thereon, means for moving said disks toward and from one another, an idle friction disk mounted to turn freely on said axle sections and having a frictional driving connection with one of said first named disks, a frictional driving cone mounted to revolve between said idle friction disk and the other frictional driving disk, the contact of said driving cone with said other frictional driving disk and said idle disk operating to revolve both of said frictional driving disks in the same direction.

2. A power transmission mechanism comprising axle sections, frictional driven disks splined thereon and having freedom of movement toward and from one another, a driving cone mounted to revolve between said driven disks and capable of adjustment toward or from the axis of said disks to vary the speed thereof, and means for moving said disks simultaneously into or out of driving position with respect to said driving cone and means interposed between one of said disks and said cone for causing said disks to revolve in the same direction.

3. A power transmission mechanism comprising axle sections, a driven disk splined thereon, a second driven disk also splined on said axle sections and having a hub thereon, an idle disk loosely mounted on said hub, said disks having cone faced friction surfaces, idle cones interposed between said second driven disk and said idle disk, a driving cone mounted to revolve between said disks, and means for moving said driven disks toward one another to engage said first named disk and said idle disk with said driving cone simultaneously.

4. A power transmission mechanism comprising axle sections, driven disks splined thereon, a driving cone mounted to revolve between said disks, means for moving said disks simultaneously into driving connection with said cone, and a reversing mechanism also interposed between said disks and having a driving connection therewith.

5. A power transmission mechanism comprising axle sections, frictional driven disks mounted thereon, a driving cone mounted to revolve between said disks, means for moving said friction disks toward or from said cone, and anti-friction reversing rolls mounted to swing between said driven disks and said cone and for driving connection with the surfaces thereof and means for causing said driven disks to revolve in the same direction.

6. A power transmission mechanism comprising axle sections, frictional driven disks mounted thereon, a driving cone mounted to revolve between said disks, means for moving said friction disks toward or from said cone, means for causing said disks to revolve in the same direction, weighted arms pivotally supported upon opposite sides of said cone and adapted to swing in vertical planes, anti-friction reversing rolls carried by said arms and adapted to drop down between said cone and said disks for reversing the direction of revolution of said disks, and means for tilting said arms to raise or lower said rolls.

7. A power transmission mechanism comprising axle sections, frictional driven disks splined thereon and having freedom of movement toward and from one another and provided with cone-faced bearing surfaces, a driving cone mounted to revolve between said driven disks and movable longitudinally toward and from said axle to vary its point of contact with said disks, an idle friction disk having a bearing on one of said driven disks and interposed between it and said cone, means between said idle friction disk and one of said driven disks for reversing their direction of movement, and means for moving said disks toward said cone and engaging said idle disk and one of said driven disks with the surface of said cone, for the purpose specified.

8. A power transmission mechanism comprising axle sections, driven disks mounted thereon, a driving cone mounted to revolve between said disks, means interposed between said driving cone and one of said disks for causing said disks to revolve in the same direction, and a reversing means interposed between said cone and disks.

9. A power transmission mechanism comprising revolving members, driven disks mounted thereon for movement toward and from each other, a driving cone mounted to revolve between said disks and means concentric with said driven disks for causing said disks to revolve in the same direction.

In witness whereof, I have hereunto set my hand this 13th day of January, 1914.

SAMUEL M. DICK.

Witnesses:
EDWARD A. PAUL,
GENEVIEVE E. SORENSEN.

Copies of this patent may be obtained for five cents each, by addressing the "Commissioner of Patents. Washington, D. C."